United States Patent Office 3,393,133
Patented July 16, 1968

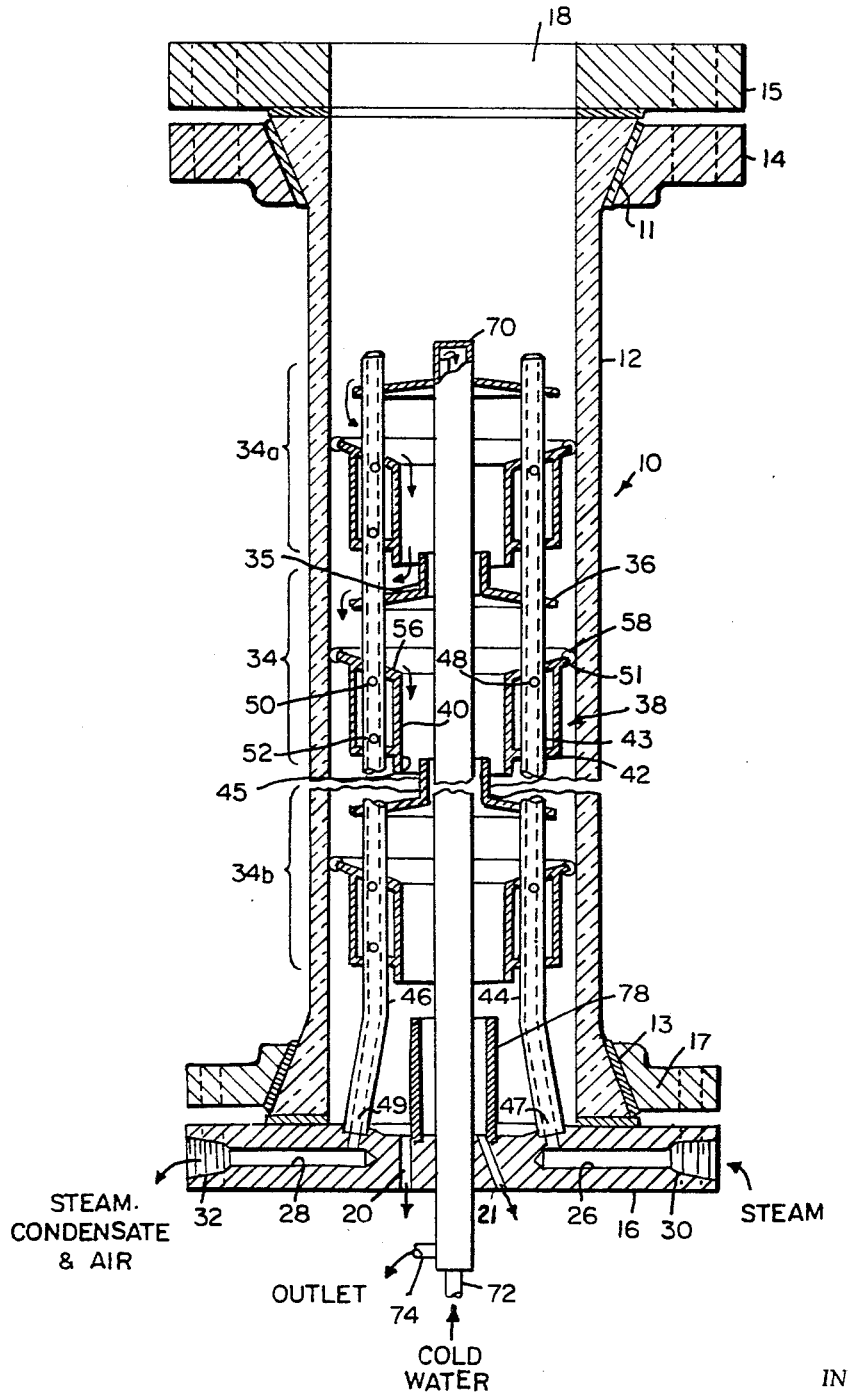

3,393,133
SHORT PATH, MOLECULAR FRACTIONAL
DISTILLATION APPARATUS AND METH-
OD THEREFOR
James L. Baird, Winchester, Mass., assignor to Artisan
Industries, Inc., Waltham, Mass., a corporation of
Massachusetts
Continuation-in-part of application Ser. No. 255,393,
Jan. 31, 1963. This application June 16, 1965, Ser.
No. 464,530
7 Claims. (Cl. 203—89)

ABSTRACT OF THE DISCLOSURE

A short path distillation fractionating apparatus of the cascade type. The apparatus includes an alternating series of tubular heating jackets and discs, which units are vertically and spatially separated within the column. A cooling tube passes concentrically through the alternating discs and tubular heating jackets and the outer surface of the tube is generally parallel to and spatially separated from the inner wall of the tubular heating jacket.

The inner circumference of the heated tubular jacket is less than the diameter of the disc directly below it. The upper portion of the tubular jacket has an inwardly and downwardly dished flange the outer circumference of which is greater than the peripheral edge of the disc directly above it.

---

My invention relates to an improved molecular still apparatus and in particular to a cascade type fractionating apparatus having a short distillation path, which apparatus is useful for fractionating heat sensitive liquid materials. This application is a continuation-in-part of my co-pending application S.N. 255,393 filed Jan. 31, 1963 and now U.S. Patent No. 3,198,241.

Molecular distillation devices are commonly used to prevent thermal degradation of liquid material such as high molecular weight organic liquids like polymers, plasticizers, long chain hydrocarbons, etc., which materials have a low vapor pressure at conventional distillation temperatures. In such devices the distance between the hot and cold surfaces is typically about the average mean free path of the molecular fraction to be distilled e.g. ½ to 4 inches. Many large scale commercial devices are not true molecular stills, but rather fractionators with a short distillation path. Molecular distillation is normally accomplished at low pressures of one micron or less, although commercial units often operate in the 10 to 100 microns or higher range.

In the past a number of falling film devices having a short distillation path have been employed, however these have not been wholly satisfactory, since the film becomes inactive or torpid so that evaporation rates are drastically curtailed. These devices also tend to channel with the subsequent development of hot dry spots which are disadvantageous where the liquid material is heat sensitive, such as in the concentration of food or pharmaceutical products. To overcome these limitations, mechanical aids such as rotors or wiping blades have been used to prevent hot spots.

It is an object of my invention to provide an improved molecular still apparatus for the treatment or fractionation of heat sensitive materials.

Another object of my invention is to provide a short path distillation fractionating device of the cascade type having no moving mechanical aids and which avoids many of the difficulties of hot spots and other problems of past devices, but which has good efficiency and distillation rates.

Other objects and advantages of my invention will be apparent to those skilled in the art from the following description of my invention and the drawing wherein FIG. 1, the sole figure, is an axial sectional fragmented view of my improved molecular still.

My parent application is directed to an apparatus and a method wherein a liquid material to be distilled is cascaded over an alternating series of tubular jackets and discs yielding a continual disruption of the vertical liquid film on the internal surface of the tube jacket in the vertical fall path after relatively short vertical distances, and in which heat is supplied primarily to the continuous moving vertical relatively-thin liquid film phase. In this manner heat is conserved, hot and dry spots on the disc surface are prevented, and the ease and efficiency of handling heat-sensitive material is enhanced. The placing of the heat exchange fluid in a heat exchange relationship primarily with the thin film phase on the internal side of the tube permits the more efficient concentration and evaporation of materials. This apparatus permits the thin film phase to be continuously disrupted by a relatively cool surface, the disc, and to be continuously reformed on a relatively hot surface, the flange and the internal surface wall of the tube jacket.

I have now discovered that the incorporation of a cooling means within the tubular jackets such as a central cooling bayonet or tube, together with means to maintain any condensate collecting on this cooling unit separate from the main process stream converts my evaporator stripper apparatus into an efficient short path distillation fractionator or molecular still. In one embodiment I provide an upright cylinder to the horizontal disc between each tubular jacket, the cylinder and disc spaced apart from the cooling surface, and designed to permit condensate on the walls of the cooling unit to flow by gravity downwardly to be recovered separately from the bottom of the unit. The upwardly extending cylinder on each disc also serves to prevent liquid from the main process stream from splashing onto the surface of the inner cooling unit. My molecular still has the vertical heating surface of the tubular jackets arranged concentrically around a central cooling surface, so that the heated vapor leaving the vertical falling film surface will travel a short predetermined distance before contacting and condensing on the vertical inner cooling surface. In this manner hot spots are prevented by the heating of the continuous moving thin falling film, a short distillation path is provided for the condensation of the vapor, and condensate is prevented from returning to and mingling with the main process stream in the unit. My apparatus therefore is suitable for handling heat sensitive liquids, requires no wiping film rotors or other mechanical aids, and provides good distillation rates.

The process of this invention typically includes: introducing a liquid feed stream into the upper portion of a heat exchange zone; and permitting the feed material to fall through an alternating series of relatively hot tubular jackets and relatively cool disc units. These discs are vertically and spatially separated from the jackets, thereby creating a free falling continuous thin film on the internal surface of the tubular jacket, which film is continuously disturbed by falling onto the relatively cool next lower disc surface, and again reformed on the lower relatively hot flange and tube surface creating a heated vapor. The heated vapor is then condensed on the vertical cooling surface spaced a short predetermined distance from the heated falling film surface on the interior of the tubular jackets. The condensate is then prevented from flowing onto the lower discs and from returning to the cascading liquid material of the main process or feed stream, and is recovered separately from the lower portion of the unit.

The non-volatile portion of the feed stream is recovered separately from the lower portion of the unit. The liquid material employed in the process may of course comprise a liquid-solid slurry, a liquid-gas mixture or a liquid mixture of miscible or non-miscible material.

The drawing shows my improved molecular still which comprises in combination an external tubular container insulating jacket 12 composed for example of thermal shock-resistant glass pipe which may be optionally heat insulated, having a flanged upper 11 and lower 13 end adapted to fit and be securely and firmly held by two opposing upper 14 and 15, and two opposing lower 16 and 17 base section flange plates. The upper base plates are securely bolted to the outlet of a liquid discharging apparatus such as a vapor-liquid separator, slurry tank, vacuum pump, etc. (not shown). The still has a liquid feed inlet opening 18 whereby the liquid feed material to be distilled comprising for example a relatively non-volatile and a relatively volatile material may be introduced into the apparatus 10. The lower base plate 16 is characterized by an outlet opening 20 through which opening the liquid residue material or non-volatile material is removed and a separate outlet opening 21 through which the liquid condensate is recovered. Both the upper and lower plates 15 and 16 are secured by bolts or other fastening means to the corresponding upper 17 and lower 14 collar plates surrounding the upper 11 and lower flanges 13 of the external jacket 12. The lower base plate is further characterized by a horizontal radially disposed heat exchange inlet conduit 26 and a heat exchange outlet conduit 28 having threaded externally disposed ends 30 and 32 for steam and drain connections.

Vertically disposed and axially aligned within the longitudinal external jacket 12 is an attending series of disc and tube evaporating units 34, 34a, 34b etc. which units are vertically positioned one above the other. The number of disc and tube units is a matter of choice depending upon the particular processes in which the equipment is to be used and the complexity and extent of the distillation or concentration of the liquid feed material desired. These units are preferably so vertically and spatially separated so that the free flowing cascading liquid material gravity or pump fed to the inlet 18 is continuously formed and re-formed into a vertical, continuous relatively thin, uniform liquid film surface after a relatively short vertical distance such as about every two to six inches e.g. every 2 to 4 inches. In this manner of disposition the most efficient use is made of the vertical thin film surface, since the majority of mass transfer in thin film liquid evaporation takes place during the first one or two or so inches of the liquid film formation in gravity feed evaporators.

A cylindrical central cooling tube 70 comprising an inlet 72 and outlet 74 conduits for the introduction and withdrawal of a heat exchange fluid such as cold water is axially disposed within the series of disc and tube units. The cooling tube 70 provides an external cold vertical wall surface substantially parallel to and spatially separated a predetermined short distance from the internal heated vertical wall surface of each tubular jacket 34. Each tube and disc unit includes a circular, convexed, horizontally disposed disc plate 36 with a vertical ring cylinder 35 extending upwardly from the inner circular hole in the disc surrounding the cooling unit 70. The cylinder surrounds and is spatially separated from the cooling tube 70 a short predetermined distillation distance.

The height of the cylinder 35 should be sufficient to prevent liquid feed material cascading downwardly from splashing onto the wall surface of the cooling tube 70. With a vertical distance of 1 to 4 inches between disc and tube units, vertical cylinder heights of 1 to 4 inches may typically be used. In some cases, where splashing is a particular problem, it is desirable to extend the height of the inner cylinder 35 upwardly to or slightly above the lower lip of the next upper tubular jacket. Of course the height of the shield 35 should not be such as to interfere with or come between inner surface of the jacket 34 and the tube 70. The cylinder should be spatially separate a sufficient distance from the inner cylindrical cooling surface of the tube 70, so that vapor material condensing on the surface may pass downwardly to outlet 21 without interference. This distance will therefore depend at least in part on the volume of condensate and typically may be ½ to 2 inches from the cooling tube 70. The uppermost disc of the still 10 should extend normally to and be in sealing contact with the central cooling tube 70 as shown, to prevent the liquid feed material introduced throuhg opening 18 from initially being deposited onto the inner tube surface. Where the liquid feed material is introduced in a more directed or careful manner, the need for a disc so designed may not be necessary.

The discs from the inner opening and cylinder 35 are convexed and gradually sloped to the lower peripheral edge 37 of the disc. A tubular jacket 38 with vertical internal and external walls 40 and 42 respectively is provided. The fluid confining portion or space 43 between the spatially separated internal and external walls form a jacket of predetermined volume and design for the introduction, circulation and withdrawal of a fluid heat exchange medium.

The internal wall has a peripheral lower lip 45 protruding slightly below the heat exchange fluid space 43 in order to permit the free fall of a liquid film from the internal wall 40 surface to the next lower disc. Providing fluid communication and support between the axially disposed series of tubular jackets 38, are vertically disposed inlet and outlet tubular risers or conduits 44 and 46 respectively opposingly disposed and having lower inlet and outlet ends 47 and 49 connecting to conduits 26 and 28 respectively. These risers pass through and provide support and fluid communication between the axially disposed heat exchange fluid spaces of each successive tubular jacket. In the lowest or first tube and disc units 34b, the inlet and outlet risers provide fluid communication between the heat exchange inlet conduit 26 and the internal heat exchange fluid cavity of the first tubular jacket and between the heat exchange fluid outlet conduit 28 and the heat exchange fluid cavity of the tube. This permits the introduction of a heat exchange fluid into the heat exchange cavities and the withdrawal of that fluid from the outlet conduit. In the upper or last units 34a the risers are sealed at the upper ends. The fluid heat exchange medium employed to provide heat to the tubular jackets and thus in a direct non-contacting manner to the continuous vertical thin film formed on the internal wall surface may be a liquid, such as water, oil, etc., or gases, such as air, hot combustion gases and preferably steam.

The inlet riser 44 is characterized by an inlet opening 48 located in the upper wall portion of the tubular riser within the jacketed tube 38 thereby permitting the heat exchange fluid to be introduced from riser 44 into and circulate about the internal heat exchange fluid space 43. The outlet riser 46 is characterized by an upper and lower opening 50 and 52 in the wall portion of the tubular riser within the jacketed tube 38. The upper opening serves as a purge opening for non-condensible fluids such as air in steam, while the lower opening is located at a height slightly above the base of the jacketed space 43 to permit any condensible fluid such as the steam condensate to drain from the jacketed space and be withdrawn with the cooled heat exchange fluid through the outlet conduit 28. The number, size, type, frequency and location of the openings depend on the particular heat exchange fluid employed and the process requirements of the apparatus. The openings should have as a minimum an upper inlet opening in the inlet riser and lower drain outlet in the outlet riser. In some applications the diameter of the inlet opening within each tube may be varied, increasing with increasing vertical distance from the fluid inlet conduit 26, thereby in the case of steam permitting the more even distribution of the steam to each unit in the jacket. Of course the disposition of the openings within each tube jacket may be the same or different depending upon the particular problems at each level or the operation.

The upper portion of the tubular disc or jacket 34 is closed and circumferentially surrounded with a convexed, inwardly dished, open centered flange 56 so adapted and disposed to permit the gravity flow of a fluid from the relative high peripheral edge of the flange toward the lower end of the dished central portion which meets and joins the internal wall of the tubular disc, thereby permitting fluid material falling on the outer edges of the dished flange to move toward the central portion and to form a thin downwardly moving vertical fluid film on the internal wall of the tube jacket 40. This flange 56 has a circumferential external protruding lip edge 58, which is provided with a tubular or asbestos ring-like sealing gasket 51 to firmly seal each disc and tube unit within the external jacket 12. The flange aids in providing lateral support to each unit, and directs the flow of any condensed material to the internal walls of the jacket. This arrangement also permits the rapid removal of the disc and tube units from the cylindrical jacket for cleaning purposes.

In between each tubular jacket, and preferably intermediately thereof, are located the convexed discs 36, whose peripheral edges 37, extend beyond the internal wall of the tube unit below so as to permit fluid material falling on the relative cool disc surface to flow by gravity feed to the outer edges and then fall to the inwardly dished flange of the next lower tube unit. The apparatus then in effect comprises a series of annular shaped tubular jackets the internal cavities thereof in fluid flow interconnection by a series of two or more vertical tubular risers for the introduction and withdrawal of a heat exchange fluid with a series of one or more discs spatially interdisposed between the tubes. This provides an apparatus whereby a heat exchange fluid may be introduced into the cavity of the jackets through the tubular risers to provide heat to the thin film liquid, vertically formed on the internal walls of the tubes and avoids directly heating the discs. In the embodiment described the discs are dished, however, these discs which furnish a liquid reforming means on a relatively cool horizontal surface can be coned, flat, cupped or of other design.

To provide for the separate recovery of the condensate from the surface of the cooling tube 70, and the non-volatile portion of the feed stream material, the plate 16 contains an upright cylinder 78 about the central cooling tube 70 and spatially separated therefrom. The outlet 21 is located between the cylinder 78 and the tube 70, so as condensate collects in the intervening space it is removed through outlet 21. The liquid residue i.e. the non-volatile material from the internal wall surface of the lowest jacket 34b falls outside of the cylinder 78, and is removed through outlet 20. The height and positioning of the collecting cylinder 78 depends at least in part on the rate and volume of condensate and the need to prevent contamination of the condensate by resplashing of the beyond residue.

In the operation liquid feed material comprising a relatively volatile and a relatively non-volatile material, is pumped or gravity fed, or otherwise introduced into the top feed opening 18 of the still 10. Steam is introduced into the inlet conduit 26 where it flows upwardly in a countercurrent direction to the feed material through the tubular inlet riser 44 to the internal jacketed cavity of the first tube and disc unit and hence to succeeding tube and disc units through openings 48, while the steam that condenses during the heat exchange operation is allowed to drain out through drain openings 52, and the outlet conduits 46 and 28. Cold water is introduced into inlet 72, circulated through the tube 70, and withdrawn continuously through outlet 74 to provide a cold condensing surface parallel to the heated interior surrounding surface of the tubular jackets. The feed material introduced will cascade over the multiple tube and disc units within the jacket. Falling initially on the upper disc 36 the liquid material then drains off the relatively cool disc falling through a vapor space or free fall zone of predetermined vertical distance which depends on the size of the unit but which can be for example 1 to 4 inches, to the dished flange 56 of the lower tube 38 from where it drains by gravity to the internal wall 40 surface and forms a continuous vertically-disposed thin liquid film over the internal wall of the tube. This film is thus placed in a non-contact heat exchange relationship with the steam within the internal tube jacket 43 and forms a heated vapor. This arrangement permits the heat to be applied substantially and primarily only to the vertically disposed downwardly moving thin film. A portion of the heated vapor from this surface condenses on the cold vertical surface of the tube 70 spaced a short distance from the heated surface. The liquid material is prevented from being heated again by retaining the condensate separate from the cascading liquid feed material.

My construction and method inhibits the application of direct heat to the relatively cooler disc surface containing the discontinuous and disturbed liquid surface or to the vapor or fall zone containing a mixture of vapor and fluid droplets, thereby preventing hot spots or overheating of any heat-sensitive material while producing a short path for the condensation of the heated vapor. From the internal wall surface 40 of the tube 38 the material drops to the next succeeding disc, and liquid feed material continually formed and re-formed into a vertical continuous thin film on the relatively hot wall surface of the tubular jackets. The liquid residue material is removed from the bottom portion of the heat exchange unit through opening 20 and the volatile vapors condensed on the surface of tube 70 and removed separately through opening 21. This apparatus can be operated under reduced pressure by connecting a vacuum pump to the opening 18.

The apparatus will find particular utility in high vacuum distillation operations, since the apparatus permits a very low pressure drop, high efficiency, low holdup time, and higher loading and flooding rates. This still is particularly useful for separating dimers and trimers, for removing inhibitors and volatiles from liquid organic polymer solutions, for the concentrating hydrocarbons, plasticizers, glycerines, and fatty acids, for the treatment of heat-sensitive material like vitamins, as well as for deodorizing and desolventizing operations.

Although the molecular still has been described with a single central cooling bayonet 70, it is, of course, within the contemplation of this invention, to employ in larger size stills, a plurality of separate or bunched cooling bayonets or tubes. Further embodiments and alterations within the scope of persons skilled in the art may be made in this invention.

There has thus been described an improved molecular still so constructed to provide heat to a downwardly moving thin film and a short condensation path for vapor, and to refuse heat to any horizontal surface thereby creating a fractionating of gravity flow material on relatively cool and hot surfaces and also avoid difficulties associated with commercial stills.

What is claimed is:

1. A short path distillation apparatus for the fractionating of heat sensitive liquid materials which apparatus comprises in combination:

an outer housing containing therein a plurality of alternating discs and tubular jackets axially arranged and each spatially separated a predetermined distance from each other, and cooling means positioned so that the external wall surface of the cooling means is substantially parallel to and spatially separated a predetermined distance from the surrounding inner wall surface of at least one tubular jacket;

the tubular jackets characterized by an enclosed tubular cavity having a circumferential inner wall surface, said surface having an internal diameter less than that of the disc directly below the tubular jacket, the jacket having an inwardly and downwardly dished flange about its upper circumference, the outer peripheral lip of the flange extending beyond the peripheral edge of the disc directly above the flange whereby liquid material from the disc is directed onto the flange and is formed into a thin downwardly moving film on the internal wall surface of the jacket before falling onto the next lower disc; and the discs generally transverse to the direction of flow of liquid material in the housing, and so shaped to direct the flow of liquid material thereon toward the outer edge of the disc, the disc characterized by an interior opening of sufficient size to permit the insertion of the cooling means therethrough, and shielding means extending upwardly from the disc about said opening, the shielding means spatially separated from the wall surface to flow downwardly without interruption, and the height of the shielding means being sufficient to prevent the contamination of the condensate by the cascading liquid material;

means to introduce into and withdraw from each tubular cavity a fluid heat exchange medium;

means to prevent the contamination of the condensate and to maintain the condensate separate from the residue of the feed material in the lower section of the apparatus;

means to remove the liquid residue material thereby providing an apparatus having a short distillation path between a vertically heated and a vertically cooled surface.

2. The apparatus of claim 1 wherein the shielding means extends upwardly from the surface of the disc to a distance of up to the bottom portion of the next higher tubular jacket surface.

3. The apparatus of claim 1 wherein the cooling means includes an elongated cylindrical center tube including means to introduce into the tube and means to withdraw from the tube a cooling fluid.

4. The apparatus of claim 1 wherein the shielding means includes a cylindrical upwardly extending shield about a circular opening in each disc through which the cooling means extends.

5. The apparatus of claim 1 wherein the means to prevent contamination of the condensate and to maintain the condensate separate includes an upwardly extending shield from the base of the apparatus, the shield about and spatially separate from the cooling means, and the means to remove the condensate positioned between said shield and the cooling means and the means to remove the residue positioned outside of said shield, the shield having a diameter such as to prevent residue material from the lowest jacket from falling within said shield.

6. A distillation apparatus which comprises in combination: an elongated cylindrical outer housing including means to introduce a liquid material to be distilled, means to remove liquid residue material, and separate means to remove liquid condensate material, the housing containing therein a plurality of alternating discs and tubular jackets axially disposed and spatially separated a predetermined distance within the housing; and an elongated centrally positioned cylindrical cooling tube, the external wall surface parallel to and spatially separated a predetermined short distance from the interior wall surface of at least one tubular jacket, and including means to introduce into and withdraw from the tube a cooling medium; the discs positioned generally transverse to the direction of flow of liquid material flowing therethrough, each disc except the uppermost disc characterized by a circular inner opening sufficient to permit the extension of the cooling tube therethrough, with a cylindrical shield extending upwardly about the opening in the disc and about the cooling tube, the shield spatially separated from the cooling tube, a sufficient distance to permit liquid distillate on the wall surface of the cooling tube to run downwardly, the height of the shield being sufficient to prevent contamination of the condensate on the tube surface by the splashing of the liquid feed material onto the discs; the uppermost disc in each unit being disposed in sealing contact with the cooling tube to prevent liquid feed material being introduced from initially contacting the cooling tube; the tubular jackets characterized by an enclosed tubular cavity having a substantially axially aligned inner wall surface, and an inwardly dished flange about the upper circumference of the jacket, the inner wall surface of the jacket, of sufficient length so that a majority of the mass transfer to the mixture to be separated occurs on this surface and having a diameter less than that of the disc below it whereby liquid material falling on the disc is directed to the outer edges, falls onto the flange of the tubular jacket below and forms a downwardly moving thin film of material on the inner wall surface of the jacket; means to introduce into and withdraw from each jacket fluid a heat exchange fluid; means to maintain separate the condensate and residue material collecting at the lower portion of the housing which includes from the base an upwardly extending cylindrical shield about and spatially separated from the cooling tube, and means positioned between said shield and the external wall surface of the tube to recover the condensate material, and means within the housing and external of the shield to recover the residue material.

7. A method of distilling a liquid feed mixture which method comprises: flowing said liquid feed mixture to be separated onto and over a relatively cool horizontally-disposed surface; discharging substantially all of said feed mixture from the horizontal surface through a relatively short free fall distance onto a relatively hot surface; reforming said mixture into a continuous downwardly-moving thin fluid film on a substantially vertical relatively hot surface; placing this moving fluid film in a heat exchange relationship with a heat exchange fluid to vaporize at least a portion of the feed mixture; permitting the non-volatilized mixture from said vertical surface to fall onto a lower relatively cool horizontally disposed surface; separately recovering the relatively non-volatile material; condensing at least a portion of the vaporized material from the hot vertical surface on a substantially parallel, relatively cold, surface, spatially separated a predetermined amount from the relatively hot vertical surface, preventing said condensate from again contacting the liquid feed material moving downwardly, and separately recovering the condensate; and repeating this sequence until the desired degree of distillation is accomplished.

References Cited

UNITED STATES PATENTS

| | | | |
|---|---|---|---|
| 1,845,159 | 2/1932 | Lea | 202—187 X |
| 2,606,146 | 8/1952 | Luten | 202—236 X |
| 2,955,990 | 10/1960 | Smith | 202—187 X |
| 3,060,106 | 10/1962 | Keunecke et al. | 202—236 X |
| 3,090,732 | 5/1963 | Pinkwart et al. | 202—187 X |
| 3,110,646 | 11/1963 | Mayhew et al. | 159—49 |

WILBUR L. BASCOMB, Jr., *Primary Examiner.*

UNITED STATES PATENT OFFICE
CERTIFICATE OF CORRECTION

Patent No. 3,393,133                            July 16, 1968

James L. Baird

It is certified that error appears in the above identified patent and that said Letters Patent are hereby corrected as shown below:

Column 7, line 25, after "surface" insert -- of the cooling means, the spatial distance between the shielding means and the wall surface being sufficient to permit condensate on the wall surface --; line 30, after "medium" insert as a separate subparagraph -- means to introduce a liquid material into the upper portion of the housing whereby the liquid material may cascade downwardly through the apparatus; --; line 35, after "apparatus" insert as a separate subparagraph -- means to remove the condensate; and --.

Signed and sealed this 6th day of January 1970.

(SEAL)
Attest:

Edward M. Fletcher, Jr.                      WILLIAM E. SCHUYLER, JR.

Attesting Officer                                         Commissioner of Patents